Aug. 18, 1942.  L. D. NADEL  2,293,427
REFLEX FOCUSING HOOD WITH COOPERATING BUILT-IN DIRECT-VISION VIEW FINDER
Filed Nov. 7, 1940  7 Sheets-Sheet 1

INVENTOR.
Louis D. Nadel
BY
his ATTORNEYS.

Aug. 18, 1942.　　　　L. D. NADEL　　　　2,293,427
REFLEX FOCUSING HOOD WITH COOPERATING BUILT-IN DIRECT-VISION VIEW FINDER
Filed Nov. 7, 1940　　　　7 Sheets-Sheet 5

INVENTOR.
Louis D. Nadel
BY
his ATTORNEYS

Aug. 18, 1942.  L. D. NADEL  2,293,427
REFLEX FOCUSING HOOD WITH COOPERATING BUILT-IN DIRECT-VISION VIEW FINDER
Filed Nov. 7, 1940   7 Sheets-Sheet 6

INVENTOR.
Louis D. Nadel
BY
his ATTORNEYS.

Aug. 18, 1942.  L. D. NADEL  2,293,427
REFLEX FOCUSING HOOD WITH COOPERATING BUILT-IN DIRECT-VISION VIEW FINDER
Filed Nov. 7, 1940  7 Sheets-Sheet 7

INVENTOR.
Louis D. Nadel
BY
his ATTORNEYS.

Patented Aug. 18, 1942

2,293,427

UNITED STATES PATENT OFFICE 2,293,427

REFLEX FOCUSING HOOD WITH COOPERATING BUILT-IN DIRECT-VISION VIEW FINDER

Louis D. Nadel, Rochester, N. Y., assignor to The Folmer Graflex Corporation, Rochester, N. Y., a corporation of Delaware Application November 7, 1940, Serial No. 364,680

25 Claims. (Cl. 95—42)

This invention relates to photographic camera focusing hoods each having a cooperating, built-in, direct-vision view finder for use when using reflex focusing.

In order that the principle of the invention may be readily understood, I have disclosed a single embodiment thereof in the accompanying drawings, wherein—

There have been numerous types of folding hoods developed through a number of years for small reflex cameras, but all of them have had certain inherent defects that are overcome by my invention which provides a focusing hood giving adequate shade when using the ground glass for focusing, and which is of more than usual height and yet can be folded compactly under a retaining cover that can quickly be converted into a direct-vision view finder.

My invention further provides a magnifier built into the hood in such way that it can be extended into the proper position for viewing the image on the ground glass when reflex focusing is used and can be readily folded out of the line of vision when so desired or when the focusing hood is folded. The hood also has attached thereto a holder for a data card in such manner that it can be quickly removed and replaced.

The invention herein disclosed may be applied to any reflex type of camera. Without, however, limiting in any way the application of my invention, I have chosen to show it applied to a reflex camera of the type disclosed in the copending application of Edson S. Hineline, Ser. No. 313,542, filed January 12, 1940.

Figure 1:
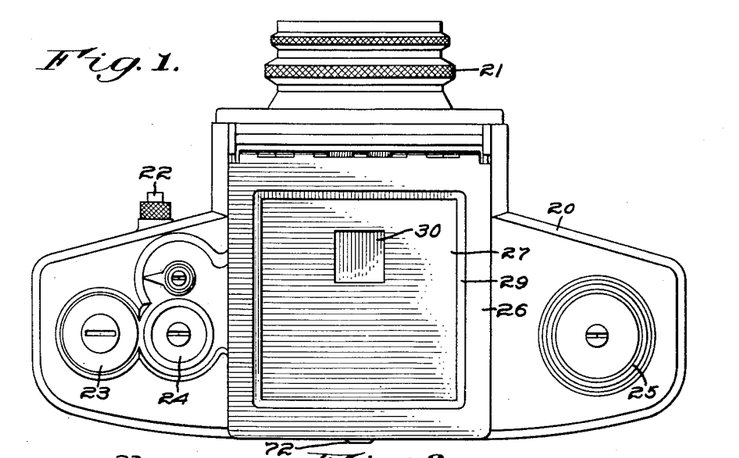
Fig. 1 is a top plan view of a reflex camera showing the focusing hood folded and the focusing hood cover in closed position.

The selected type of camera is of the general form and structure indicated in Fig. 1 and is there shown as made up of an outer case or box 20 carrying the usual objective lens mount 21, shutter release 22, shutter winding knob 23, shutter setting knob 24 and exposure counter dial 25. While said parts may be of any suitable character, they are desirably of the structure and arrangement fully disclosed in said application, but inasmuch as my invention is not particularly concerned therewith, it is not necessary to refer to them in detail.

Referring first to Figs. 1 to 6 as disclosing the general structure of the hood cover portions and the hood itself, the main or outer hood cover member is indicated at 26, and with its associated parts or members (to be described) it is so constructed as to serve the dual purpose of holding the focusing hood in collapsed position and also of acting as a direct-vision view finder which, so far as I am aware, is wholly new in the art, irrespective of the particular structure employed, which is shown as a selected embodiment of my generic invention.

The main or outer member 26 of the hood cover assembly is shown in closed position in Figs. 1 and 2 and in open position in Fig. 3 with an associated part or intermediate cover member 27 thereof, erected to form a direct-vision view finder, as will be described in detail at a subsequent point.

Figure 3:
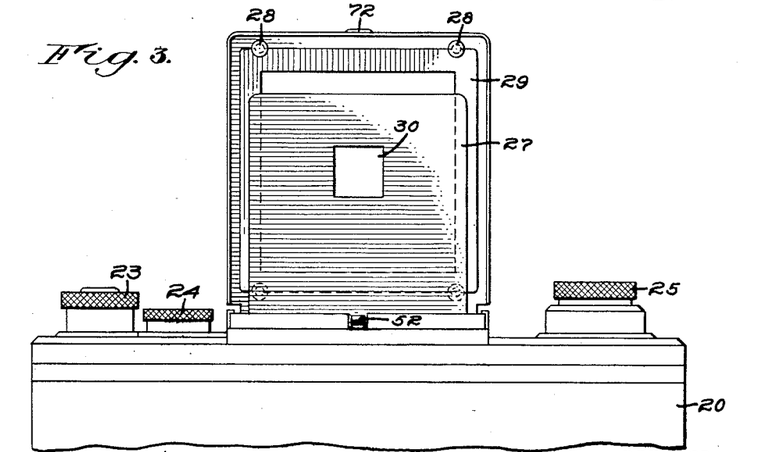
Fig. 3 is a view similar to Fig. 2 but with the focusing hood cover opened to form a direct-vision view finder, the hood being held in folded position.
Figure 7:
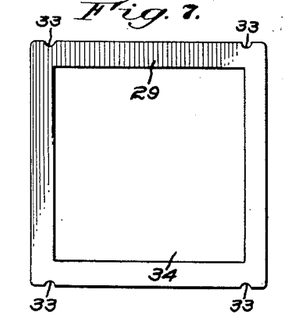
Fig. 7 is a plan view of a mask for use in the direct-vision view finder when a large opening is used corresponding to the field of a normal focal length lens.
Figure 8:
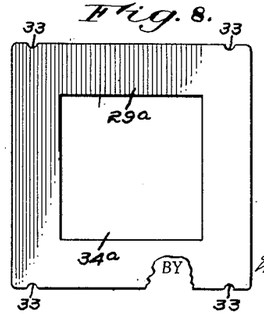
Fig. 8 is a plan view of a mask for use in the direct-vision view finder, but having an opening corresponding to the field of view of a longer focal length lens.

As shown in Figs. 3, 12, 16, 17, etc., the said hood cover member 26 is provided with shoulder rivets 28 to engage either mask 29 or 29a best shown in Figs. 7 and 8, and which are so constructed as to be quickly interchangeable. The said cover member 27 is provided as shown in Figs. 3 and 6 with a preferably square opening 30 through which the image is viewed.

Figure 2:
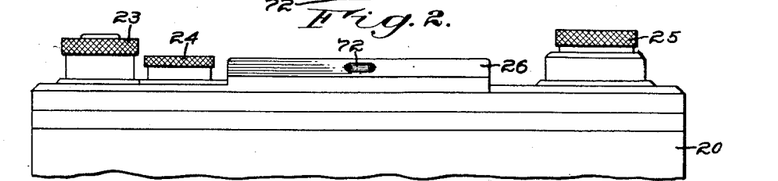
Fig. 2 is a partial rear elevation of the structure shown in Fig. 1.
Figures 4, 5, 6:
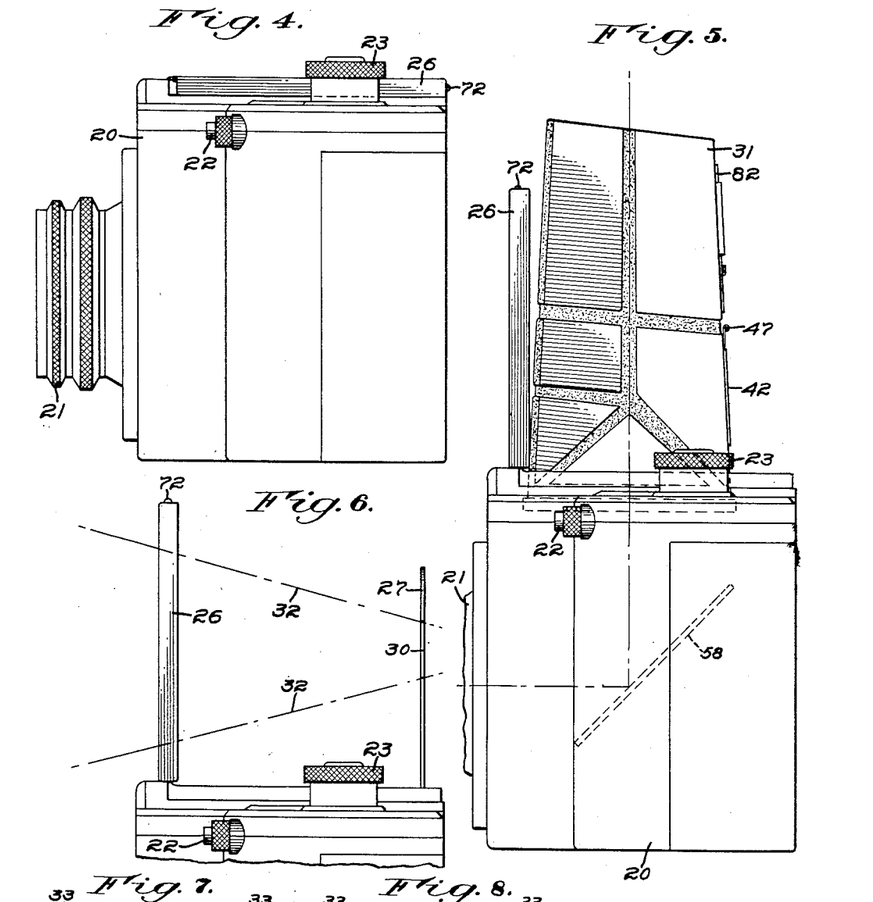
Fig. 4 is a side elevation of the camera with the focusing hood collapsed and the entire cover in closed position.
Fig. 5 is a view similar to Fig. 4, but showing the focusing hood extended for shading the ground glass focusing screen for reflex focusing.
Fig. 6 is a partial end elevation of the structure shown in Fig. 4 but with both the cover parts erected to form a direct-vision view finder.
Figure 11:
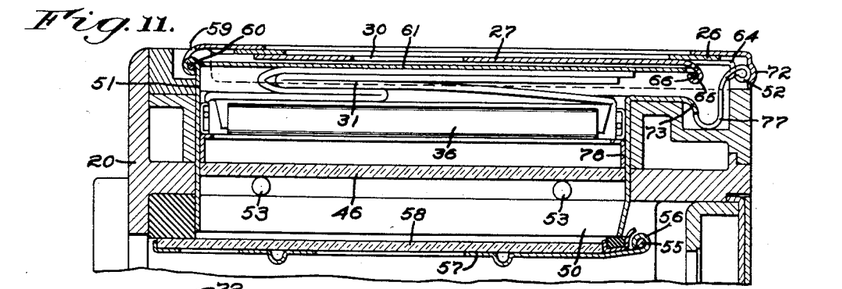
Fig. 11 is a partial vertical section similar to Fig. 9, but showing the hood and camera cover in closed position, the mirror being in the "up" position corresponding to the position it occupies when a picture is being made.

The focusing hood itself is indicated generally at 31 and is shown in its erect position in Fig. 5 and in other figures, but in its folded or collapsed condition in Figs. 2, 4 and 11. Also in Fig. 6 the focusing hood is in a collapsed condition and both the hood cover member 26 and the intermediate or co-acting cover member 27 are in erected or vertical position. The broken lines 32, 32 in Fig. 6 indicate the angle of view through the direct-vision finder when the mask 29 of Fig. 7 is in place. Both masks 29, 29a are provided with notches 33, 33 for engaging the shoulder rivets 28, 28, as clearly shown in Fig. 3. Said masks are respectively provided with central rectangular openings 34, 34a respectively corresponding in area to the angle of view of the particular objective lens to be used in making the photograph.

Figures 9, 10:
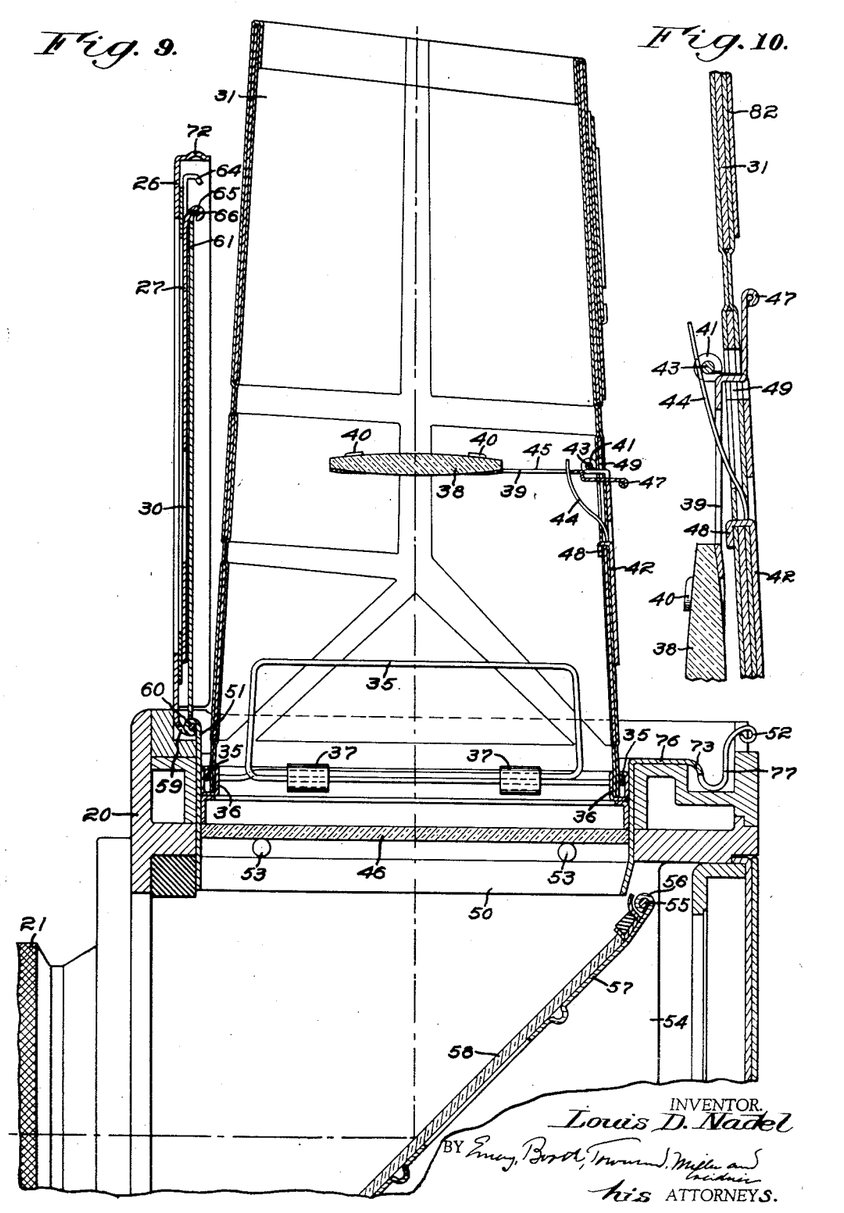
Fig. 9 is a transverse vertical section through the camera showing upon a large scale the structure of the focusing hood, the focusing hood cover and the mounting of the magnifier with respect to the ground glass and the reflecting mirror.
Fig. 10 is an enlarged partial vertical section of Fig. 9, but showing the magnifier in folded position.
Figure 19:
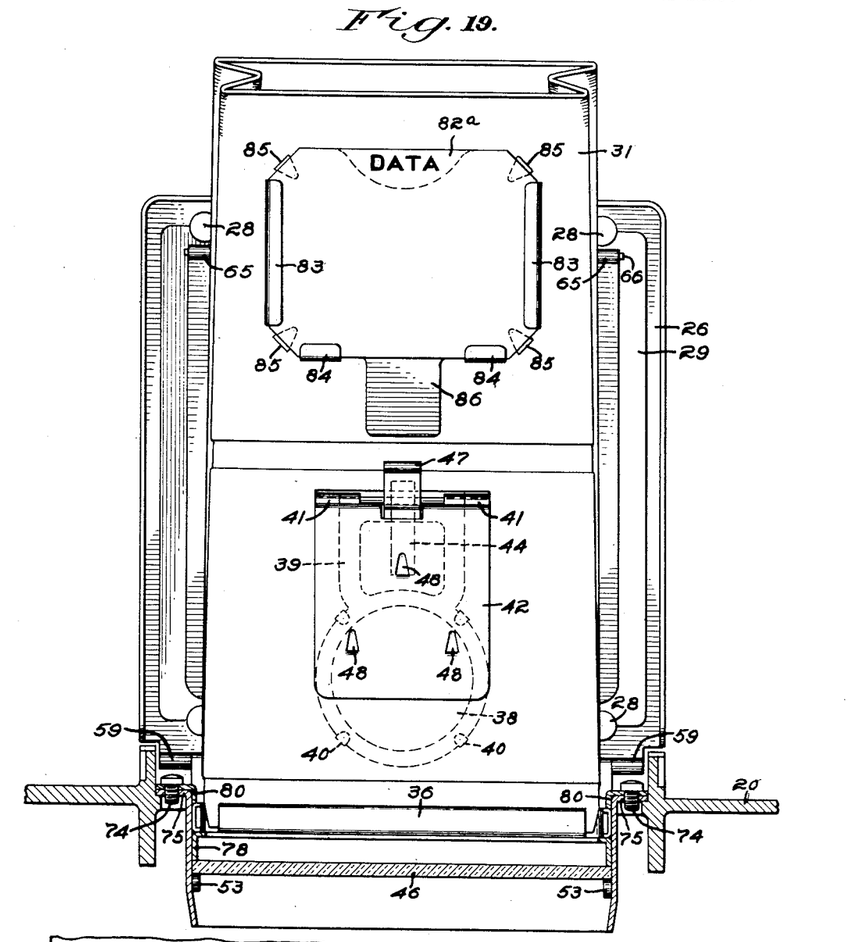
Fig. 19 is a rear elevation partially in vertical section showing the focusing hood in extended position and the magnifier in folded position.

Referring more particularly to Figs. 9, 10 and 19, wherein the focusing hood 31 is shown in erected position, it is noted that while the invention is not limited to such a structure of hood, the said hood is shown as of a construction generally similar to that disclosed and claimed in the patent to Petit and Hineline No. 1,980,546, dated November 13, 1934. As herein shown the said hood is so made as to be readily foldable, being of or containing suitable flexible material. It is held in erected position by springs 35, 35 bent into frames of general rectangular shape, as best appears from Fig. 9. The said hood is provided at its lower end with a preferably sheet metal frame 36 and the springs 35, 35 are further held by the bent-over bosses 37, 37 of the said frame 36, having their ends anchored in the said hood frame.

Attached to the said hood 31 is a magnifier 38 pivotally mounted in its frame 39 by clamping members 40, 40. The said frame 39 is provided with a hinge end 41 and also attached to the said hood is a hinge plate 42. The said plate frame 39 is secured to the hinge plate 42 by means of a hinge pin 43. Also attached to the hinge plate 42 is a spring plate member 44 riding in an opening 45 of the magnifier supporting frame 39. The function of the spring plate member 44 is to hold the magnifier and its supporting frame in a horizontal or transverse position when the magnifier is being used to view the image on the ground glass 46 of usual character.

The opposite end of the magnifier supporting frame 39 is provided with an outwardly extending portion 47 protruding through the back of the focusing hood 31 and through an opening in the plate 42, so that the said magnifier 38 can be placed in functioning position from the outside of the said hood. The said plate 42 is provided with parallel hook formations 48, 48, best shown in Fig. 19, but shown in section in Figs. 9 and 10, for the purpose of extending through the side wall of the hood 31 to hold the plate 42 securely thereagainst. The said hood 31 is provided with a hole 49 through which the hinge, made up of the parts 39, 41, 42, 44 and 47, is permitted to pass.

Figure 12:
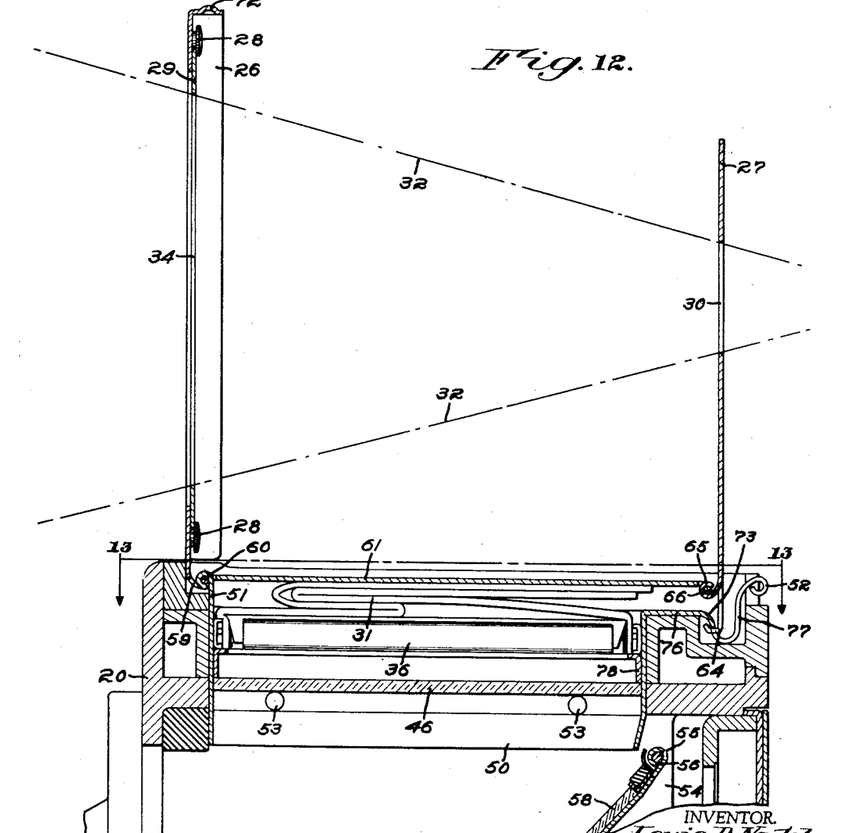
Fig. 12 is a partial vertical section similar to Fig. 9, but showing the focusing hood in closed position and with the parts of the camera cover in position for use as a direct-vision view finder.

As best shown in Figs. 9, 11, 12, 15, and 19, the camera case 20 is provided with an opening for receiving a hood-supporting frame 50 desirably made as a sheet metal box having an upwardly extending hinge member 51 and latch member or spring end 52 at opposite walls of the camera case, as best appears in Figs. 9 and 12. Riveted to the hood supporting frame 50 is a series of studs 53, 53 for supporting the said ground glass 46. The camera wall 54 of the case 20 is provided with a suitable hole for receiving a hinge pin 55 which itself supports the hinge structure 56 of the mirror frame 57 having attached thereto the usual reflecting mirror 58. These parts just described may be substantially as shown in the said Hineline application Ser. No. 313,542, but my invention is in no sense limited thereto.

Figure 13:
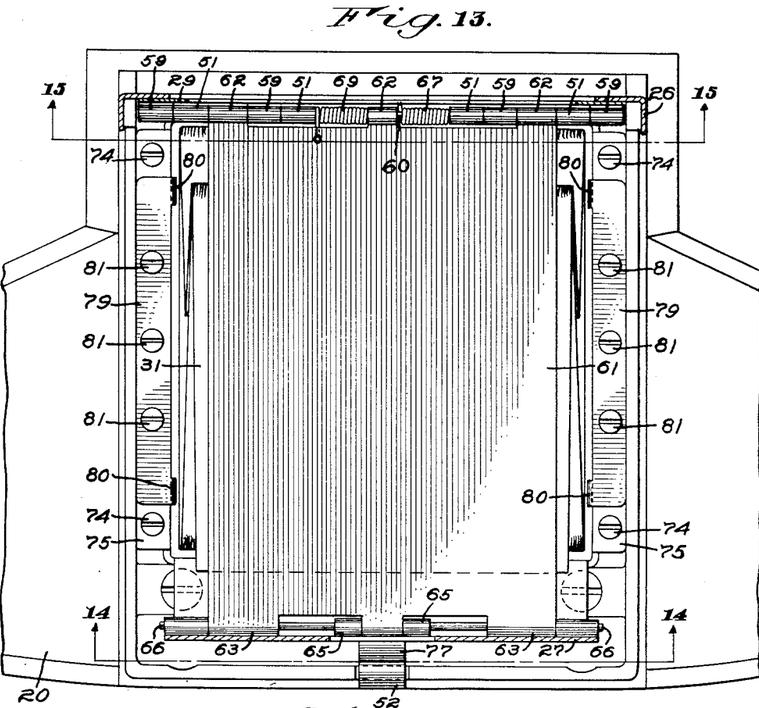
Fig. 13 is a top plan view of the camera, but partially in horizontal section on line 13—13 of Fig. 12.
Figure 14:
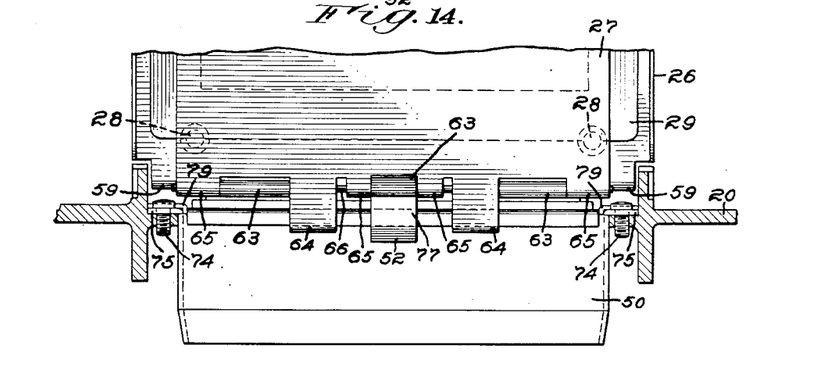
Fig. 14 is a vertical section on the line 14—14 of Fig. 13.
Figure 15:
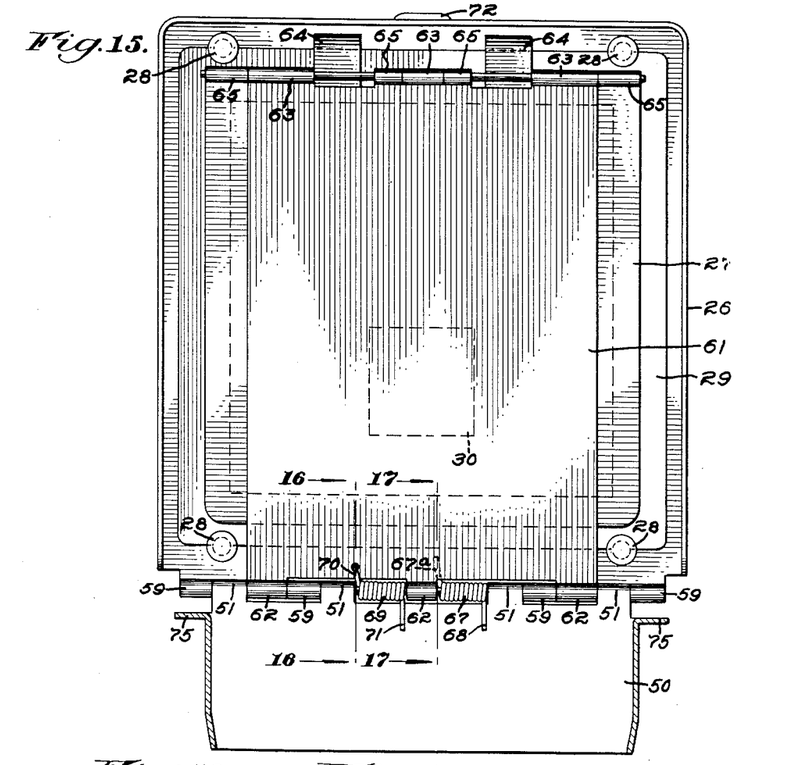
Fig. 15 is a vertical section on the line 15—15 of Fig. 13.
Figure 16:
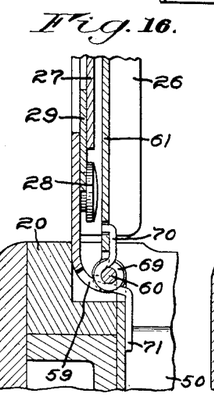
Fig. 16 is a vertical section on the line 16—16 of Fig. 15.
Figures 17, 18:
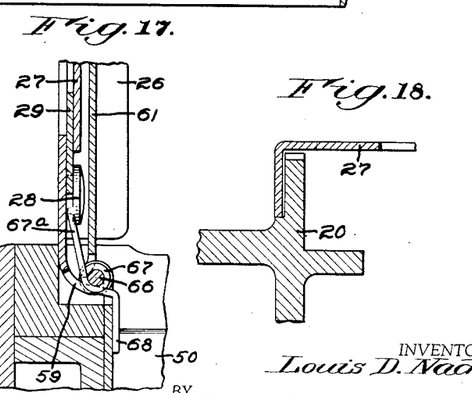
Fig. 17 is a vertical section on the line 17—17 of Fig. 15.
Fig. 18 is a fragmentary detail in vertical section showing in part the camera hood cover fitted over the camera case.

Referring more particularly to Figs. 9 and 13 to 18, the hood cover member 26 is desirably of sheet metal and is of a box-like formation, the lower end thereof being provided with a hinge formation 59, best shown in Fig. 15 and being held to the hood supporting frame 50 by means of hinge pin 60, shown also in Fig. 16. The inner cover 61 is desirably made as a flat piece of metal having a lower hinge formation 62, 62, shown in Fig. 15, and also engaged by the hinge pin 60. On the opposite end of the inner cover 61 is a second hinge formation 63, 63 (best shown in Fig. 13) for the purpose of supporting the intermediate cover member 27, when in its erected position, shown in Fig. 12. The said inner cover 61 is also provided with latching means 64, the function whereof is subsequently disclosed herein.

Lying between the focusing hood cover member 26 and the inner cover 61 is the intermediate cover member 27, previously referred to and which has a hinge formation 65, 65, and is hinged to the inner cover 61 by hinge pin 66, as shown at the right hand side of Fig. 12. As shown in Fig. 15, the outer or hood cover member 26 is caused to be held in the erected position there shown and also shown in Fig. 12 and elsewhere, by means of a coiled spring 67 having an end finger 67a resting against the inner wall of the outer or hood cover member 26. The spring 67 is provided with a finger 68 at its opposite end, which rests against the inner wall of the focusing hood supporting frame 50 and which causes the said cover member 26 to be swung or rotated in contra-clockwise direction, viewing Fig. 9. A second spring 69, best shown in Figs. 15 and 16, is also carried by the hinge pin 60 and has at one end a finger 70 resting against the said inner cover 61, and at its opposite end it has an oppositely extending finger 71 resting flatwise against the inner wall of the focusing hood supporting frame 50. The said spring 69 causes the inner cover 61 to be moved in a contraclockwise direction viewing Fig. 9, thus holding the entire cover assembly in an erect position when released from folded condition in the camera case in the manner about to be described. In Fig. 11, the hood 31 is shown folded down over the cover or cover members 61, 27 and 26, of which the latter is held in closed position by an extruded notch-like formation 72 engaging the retaining spring end 52, thus holding said cover member 26 in closed position. A slight upward pressure on the cover member 26 applied at the right hand edge thereof, viewing Fig. 11, disengages the extruded formation 72 from the spring end 52, thus allowing the cover assembly, made up of the covers or cover members 26, 27 and 61, to swing upwardly instantly automatically to the position shown in Fig. 9, allowing the hood 31 to be erected under the influence of the springs 35, 35. The camera is then in a condition to be used when focusing in accordance with the reflex principle (i. e. on the ground glass 46).

When it is desired not to use the focusing hood, said hood 31 is folded down, as shown in Fig. 12, and the inner cover 61 is swung downward in a clockwise direction, compacting said hood 31, and at the same time the intermediate cover member 27, which is hinged on the right hand edge of the inner cover 61, viewing Fig. 12, is held in its said erect position by the latching means 64 engaging the rim 73 of the hood supporting frame 50, as indicated in Fig. 12. The said hood 31 is thus held compressed under the inner cover 61 and the intermediate cover member 27 becomes, as is evident from Fig. 12, the co-acting member of a direct view finder, the sighting taking place through the opening 30 thereof and the opening 34 of the mask 29 which, being carried by the outer cover member 26, is also in the erected position shown at the left in Fig. 12.

In order to close the camera, and referring particularly to Fig. 12, it is merely necessary to press down on the intermediate cover member 27, moving it in a contraclockwise direction, viewing that figure, far enough to disengage its hook 64 from the rim 73 and continuing to turn the said intermediate cover member 27 until it overlies the inner cover 61. The outer cover member 26 which is at this time still erect, as shown at the left in Fig. 12, is swung in a clockwise direction, viewing Fig. 12, until the extruded formation 72 thereof is engaged by the spring end 52, shown at the right in Fig. 12. The parts will now be in the position shown in Fig. 11.

Referring now particularly to Figs. 9, 12, 13, 14 and 19, the hood supporting frame 50 is held in the camera case 20 by means of a series of screws 74 passing through the two bent-over flanges 75, 75 of the supporting frame 50 which is provided with such flanges 75, 75 extending parallel to the axis of the objective lens of the camera, for the support of the hood supporting frame 50 and with a third flanged-over member 76, best shown in Fig. 9, extending at right angles with respect to the center axis of the objective lens. Extending from the flange 76 and the rim 73 is a U-shaped arm 77 forming the body portion of the spring end 52. The ground glass 46, which is supported on the studs 53, 53, as already described, is held in position by a frame 78, shown in Fig. 19 as of a box-like formation having its upper or horizontal part cut away to provide an opening for viewing said ground glass 46.

The hood frame 36 overlies the ground glass retaining frame 78, and it is held in position by means of strips 79, 79, shown in Figs. 13 and 14, as engaging the hood frame 36, the said strips having turned-down ends 80, 80, shown in Fig. 19 as engaging the upper face of the hood frame 36, being secured to the camera case 20 by means of screws 81, 81, shown in Fig. 13, as passing also through holes in the flanges 75, 75 of the hood supporting frame 50, being threaded into the camera case 20. Thus, I have provided means for quickly removing the hood assembly 31 from the hood supporting frame 50 so as to permit access to the ground glass 46 for cleaning, replacement or other purposes. The described structure also permits considerable variation in the thickness of the ground glass, this being a very important requirement with respect to economical manufacture.

Figure 20:
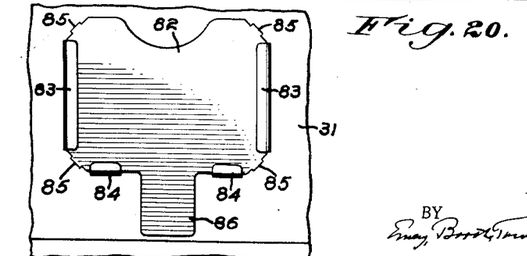
Fig. 20 is a fragmentary detail of the focusing hood showing the holder for a data card.

Referring now to Figs. 19 and 20, there is attached to the hood 31 a metal plate 82 having bent-in edge formations 83, 83 on either side, and bent-up formations 84, 84 on the lower edge. The purpose of these formations is to permit the insertion of a data card, such as shown at 82a on which may be recorded data at the time of making exposures. The said plate 82 is secured to the hood 31 by fingers 85, 85 thereof passing through a wall of the hood 31 and then clenched over thereagainst. The said plate 82 is shown as having an extension 86 serving as a buffer plate to prevent the hood 31 from being worn through or otherwise disfigured by the magnifier lens operating member 47 when the hood 31 is in a folded condition.

It will be evident from the foregoing description that the camera is shown in Figs. 1 and 11 in its normal folded condition. If it is desired to use a direct-vision view finder, the focusing hood cover member 26 is released by upward pressure on the extruded boss 72 of Fig. 11, as already described. The hood cover member 26 then springs automatically into the position shown in Figs. 3, 5 and 9, and the hood 31 is also automatically erected as described. It is now necessary to fold the hood 31 down to permit the use of the direct-vision view finder. This is accomplished by a slight pressure on the sides of the hood, the operator at the same time pushing downward on the top of the hood. The structure is such that it will readily fold into a compact mass of smallest possible volume, as shown in Figs. 11 and 12. The inner cover 61 and the intermediate cover member 27 are then together swung in a clockwise direction, and after the inner cover 61 has reached the horizontal position shown in Fig. 12, the intermediate cover 27 is then swung on its hinge formations 65, 66 at the edge of the now horizontal cover 61 until said cover member 27 rises to a vertical position, as shown in Fig. 12, and the said intermediate cover member 27 at its lower end, viewing Fig. 12, engages by its hook 64 the rim 73 of the hood supporting frame 50.

In order to close the camera after an exposure has been made, it is necessary merely to push the intermediate cover member 27 in an inward or contraclockwise direction from the position shown in Fig. 12, at the same time closing down the cover member 26 until the formation 72 thereof is engaged by the latch member or spring end 52.

If the camera is to be used as a reflex camera without employing the direct-vision view finder, when the cover member 26 has been released and is allowed to assume the position shown in Fig. 9, the hood 31 instantly automatically erects itself and assumes its position for use. The magnifier 38, however, will at such time be in the folded-down position shown in Fig. 10. It is moved to the working or horizontal position, shown in Fig. 9, by downward pressure on its handle 47. When closing the camera the procedure is that already described, but first the magnifier 38 must be returned to the position shown in Fig. 10.

My invention provides in a reflex camera having a focusing hood, a direct-vision view finder which, in the described embodiment of the invention, is composed of three parts, two of which are, when erected, the two elements of the said view finder, and the third of which holds the focusing hood in collapsed position and also carries one of the said elements of the view finder when functioning as such.

My invention comprehends a camera view finding system combining all the features of a direct-vision finder and a reflex finder without in any way increasing the size of the camera as an entity. At the same time there is by my invention provided a self-erecting focusing hood that is sufficiently high to shield properly the ground glass from extraneous light during the act of focusing. The construction of the various parts is notwithstanding simple, and the camera finder can be manufactured at very low cost.

Having thus described one illustrative embodiment of the invention, it is to be understood that although specific terms are employed, they are used in a generic and descriptive sense and not for purposes of limitation, the scope of the invention being set forth in the following claims.

I claim:

1. A reflex photographic camera having a collapsible unitary focusing hood completely encircling, when erected, the light-shaft above the ground glass of the cover, and foldable as a unit into collapsed condition parallel with and above said ground glass, and a cover for said hood constituting a structure that is distinct from said hood and itself hingedly attached to the camera, said cover constituting also a direct-vision view finder when opened and for that purpose having two connected members, each having a vision-finding opening therein, both said members being foldable down onto the unitary collapsed hood and operable into upstanding, spaced, parallel relation.

2. A reflex photographic camera having a unitary focusing hood completely encircling, when erected, the light-shaft above the ground glass of the camera and foldable as a unit into collapsed condition parallel with said ground glass, said camera having a direct-vision view finder attached to the camera and distinct from said hood and adapted to be used alternatively with said hood, said view finder having two connected members, each having a vision-finding opening therein, both said members being foldable down onto the unitary collapsed hood and openable into upstanding, spaced, parallel relation, and constituting in its non-functioning position as to both of said connected members a cover for the collapsed focusing hood.

3. A reflex photographic camera having a unitary collapsible hood completely encircling, when erected, the light-shaft above the ground glass of the camera and foldable as a unit into collapsed condition parallel with said ground glass, said camera also having a direct-vision view finder distinct from said hood and having two connected members, each having a vision-finding opening therein, both said members being foldable down onto the unitary collapsed hood and openable into upstanding, spaced, parallel relation, with means whereby either of said devices can be moved into functioning position and the other moved out of functioning position, said view finder, when out of functioning position, therefore constituting as to both its parts a cover for the hood when the latter is in collapsed condition.

4. A reflex photographic camera having a focusing hood completely encircling, when erected, the light-shaft above the ground glass of the camera, and foldable into collapsed condition parallel with and above said ground glass, and a cover for said hood constituting a structure that is distinct from said hood, and itself constituting also a direct-vision view finder, said cover including one member serving when erected as one element of a direct-vision view finder and having another member to serve as the other element of said view finder, said other member being composed of two parts hinged together, one of said parts of said other member being constructed to lie flat over the collapsed hood and the other of said parts constructed to be erected from an edge thereof and thereby function as a part of the view finder.

5. A reflex photographic camera having a focusing hood completely encircling, when erected, the light-shaft above the ground glass of the camera, and foldable into collapsed condition parallel with and above said ground glass, and a cover for said hood constituting a structure that is distinct from said hood, and itself constituting also a direct-vision view finder, said cover including one member serving when erected as one element of a direct-vision view finder and having another member to serve as the other element of said view finder, said other member being composed of two parts movably connected together, and both of said members being respectively hingedly mounted upon said camera adjacent to the hood so as to be folded down thereonto when the hood is collapsed.

6. A reflex photographic camera having a unitary focusing hood completely encircling, when erected, the light-shaft above the ground glass of the camera, and foldable into collapsed condition parallel with and above said ground glass, and a cover for said hood constituting a structure that is distinct from said hood, and itself constituting also a direct-vision view finder, said cover including one member distinct from the hood and serving when erected as one element of a direct-vision view finder and having another member also distinct from the hood and serving as the other element of said view finder, said cover being pivotally mounted upon the camera casing adjacent one side of the light-shaft enclosing wall of the hood so as to be folded down as a cover onto the said hood when collapsed.

7. A reflex photographic camera having a focusing hood completely encircling, when erected, the light-shaft above the ground glass of the camera, and foldable into collapsed condition parallel with and above said ground glass, and a cover for said hood constituting a structure that is distinct from said hood, and itself constituting also a direct-vision view finder, said cover including one member serving when erected as one element of a direct-vision view finder and having another member to serve as the other element of said view finder, said cover being pivotally mounted upon the camera casing adjacent one side of the light-shaft enclosing wall of the hood so as to be folded down as a cover onto the said hood when collapsed, said first member constituting the outer part of the cover and the other member comprising two parts hinged together, one of said two parts of said other member being hinged with the outer cover member and adapted when folded down onto the collapsed hood to constitute a cover therefor and the other of said two parts of said other member being adapted to be erected from an edge of the said cover to serve as one element of the view finder.

8. A photographic camera of the reflex type having a unitary collapsible focusing hood adapted when erected entirely to surround the light shaft above the ground glass, a supporting frame 50 for the hood, the case of said camera having an opening for receiving said supporting frame, the latter being a sheet metal box-like structure provided with a hinge member at one side and a latch member at the opposite side, and a cover for the hood structurally wholly distinct therefrom and which is pivotally received upon said hinge member and adapted when superimposed over the unitary collapsed hood to engage with the said latch member.

9. A photographic camera of the reflex type having a unitary collapsible focusing hood adapted when erected entirely to surround the light shaft above the ground glass, a supporting frame 50 for the hood, the case of said camera having an opening for receiving said supporting frame, said frame having an upstanding hinge member 51 at one side thereof and a latch member 52 at the opposite side, and a cover for the collapsed hood structurally wholly distinct therefrom and pivoted upon the hinge member 51 and having at an opposite edge a formation 72 to engage the latch member 52 so as to be held in cover-functioning position.

10. A photographic camera of the reflex type having a collapsible focusing hood, a supporting frame 50 for the hood, the case of said camera having an opening for receiving said supporting frame, the said frame being structurally distinct from said camera case and having formations to support the ground glass, whereby the said frame with said ground glass may be removed as a unit from the camera case.

11. A photographic camera of the reflex type having a unitary collapsible focusing hood adapted when erected entirely to surround the light shaft above the ground glass, a supporting frame 50 for the hood, the case of said camera having an opening for receiving said supporting frame, said frame at one side having a hinge member 51 and at the opposite side having a spring latch member 52 and a cover for the collapsed hood structurally distinct from said hood and pivotally mounted upon said hinge member 51 and at its opposite edge having an extruded formation 72 to engage the spring latch member 52 and thereby hold the cover in closed position.

12. A photographic camera of the reflex type having a unitary collapsible focusing hood adapted when erected entirely to surround the light shaft above the ground glass, a supporting frame 50 for the hood, the case of said camera having an opening for receiving said supporting frame, said frame being structurally distinct from the camera case and itself at one side having a hinge member 51 and at the opposite side having a spring latch member 52 and a cover for the collapsed hood structurally distinct from said hood and pivotally mounted upon said hinge member 51 and at its opposite edge having an extruded formation 72 to engage the spring latch member 52 and thereby hold the cover in closed position, said cover being disengageable from the said spring member by pressure upon the cover adjacent said extruded formation.

13. A photographic camera of the reflex type having a unitary collapsible focusing hood adapted when erected entirely to surround the light shaft above the ground glass, a supporting frame 50 for the hood, the case of said camera having an opening for receiving said supporting frame, said frame being structurally distinct from the camera case and itself at one side having a hinge member 51 and at the opposite side having a spring latch member 52 and a cover for the collapsed hood structurally distinct from said hood and pivotally mounted upon said hinge member 51 and at its opposite edge having an extruded formation 72 to engage the spring latch member 52 and thereby hold the cover in closed position, said cover being disengageable from the said spring member by pressure upon the cover adjacent said extruded formation, the said hood having spring members normally tending to erect the hood upon release of said cover at the said extruded formation.

14. A photographic camera of the reflex type having a collapsible focusing hood complete in itself, a supporting frame 50 for the hood, the case of said camera having an opening for receiving said supporting frame, a hinge member 51 at one side of said frame, a latch member at the other side of said frame and a cover for the collapsed hood but distinct therefrom mounted upon said hinge member 51, said cover consisting of three parts, the outer one and the innermost one of which are directly pivoted upon said hinge member, and the intermediate one of which is pivotally mounted upon an opposite edge of said innermost part, so that when the said innermost part occupies a position overlying the collapsed hood, the intermediate part may be erected, said outer part and said intermediate part constituting the co-acting elements of a direct-vision view finder.

15. A reflex camera having a collapsible hood, an inner wall whereof has a plate secured thereto, said plate having bent formations penetrating the wall of the hood to secure the plate in place, the said plate having also formations extending from edge portions thereof to receive and support a data card.

16. A reflex photographic camera having a unitary collapsible focusing hood completely encircling, when erected, the light-shaft above the ground glass of the camera and foldable as a unit into collapsed condition parallel with and above said ground glass, and a cover for the collapsed hood hingedly mounted upon a wall of the camera and structurally distinct from said focusing hood, said cover having two parts constituting the elements of a direct-vision view finder, and also a part which overlies the collapsed hood when the other parts of said cover are erected in view-finder functioning position, said parts of the view finder being quickly erectable into spaced view finder functioning position when the hood is in collapsed position between said parts.

17. A structure according to claim 4, but in which both said members of said cover are respectively directly hinged to the camera.

18. A structure according to claim 4, but in which both said members of said cover are respectively directly hinged to the camera at the same side of said focusing head.

19. A structure according to claim 4, but in which both said members of said cover are respectively directly hinged to the camera, the other part of said other member of the cover, when erected, being thereby stationed at the opposite side of the collapsed hood from said first mentioned member of said cover.

20. A structure according to claim 4, but in which both said members of said cover are respectively directly hinged to the camera, the said two parts of said other member of said cover being hinged together at the edge of the first of said parts most remote from and opposite to the edge thereof that is hinged to the camera.

21. A camera structure according to claim 14, but in which the said supporting frame 50 is a sheet metal, open, substantially rectangular frame structurally distinct from but attached to the camera case, and having the said hinge and the said latch member upstanding from said supporting frame and integral therewith.

22. A camera structure according to claim 14, but in which the said supporting frame 50 is a sheet metal, open, substantially rectangular frame structurally distinct from but attached to the camera case by means of opposite, bent-over edge flanges provided with said supporting frame, and securing means extending through said flanges into the substance of the camera case and having the said hinge member and the said latch member upstanding from said supporting frame and integral therewith.

23. A structure according to claim 12, but in which the said hinge member of the supporting frame also has pivotally mounted thereon an inner cover member 61 adapted to be folded down flatwise on the collapsed focusing hood.

24. A structure according to claim 12, but in which the said hinge member of the supporting frame also has pivotally mounted thereon an inner cover member 61 adapted to be folded down flatwise on the collapsed focusing hood, and an intermediate cover member 27 having an opening to serve as a view finder and hinged to the edge of the inner cover member 61 that is opposite to the edge thereof which is hinged to the supporting frame.

25. A structure according to claim 12, but in which the said hinge member of the supporting frame also has pivotally mounted thereon an inner cover member 61 adapted to be folded down flatwise on the collapsed focusing hood, and an intermediate cover member 27 having an opening to serve as a view finder and hinged to the edge of the inner cover member 61 that is opposite to the edge thereof which is hinged to the supporting frame, said intermediate cover member 27 having a portion which, when said cover member 27 is erected, engages and is supported by the spring latch member 52.

LOUIS D. NADEL.